United States Patent [19]

Hazu et al.

[11] Patent Number: 5,263,088
[45] Date of Patent: Nov. 16, 1993

[54] ADAPTIVE BIT ASSIGNMENT TRANSFORM CODING ACCORDING TO POWER DISTRIBUTION OF TRANSFORM COEFFICIENTS

[75] Inventors: Fumie Hazu; Masahiro Iwadare, both of Tokyo, Japan

[73] Assignee: NEC Corporation, Tokyo, Japan

[21] Appl. No.: 728,679

[22] Filed: Jul. 12, 1991

[30] Foreign Application Priority Data

Jul. 13, 1990 [JP] Japan .................................. 2-186347

[51] Int. Cl.$^5$ ................................................. G10L 3/02
[52] U.S. Cl. ......................................... 381/30; 381/31; 381/34
[58] Field of Search ...................... 381/29–40

[56] References Cited

U.S. PATENT DOCUMENTS

| | | | |
|---|---|---|---|
| 4,184,049 | 1/1980 | Crochiere et al. | 381/31 |
| 4,516,258 | 5/1985 | Ching et al. | 381/31 |
| 4,535,472 | 8/1985 | Tomcik | 381/31 |
| 4,703,480 | 10/1987 | Westall et al. | 381/30 |
| 4,964,166 | 10/1990 | Wilson | 381/36 |
| 4,965,830 | 10/1990 | Barham et al. | 381/31 |
| 4,991,213 | 2/1991 | Wilson | 381/34 |

OTHER PUBLICATIONS

Zelinski, et al. "Adaptive Transform Coding of Speech Signals", IEEE Transactions on ASSP, vol. 25, No. 4, 1977, pp. 299–309.
Zelinski, et al. "Approaches to Adaptive Transform Speech Coding at Low Bit Rates", IEEE Transactions on ASSP, vol. 27.

Primary Examiner—Dale M. Shaw
Assistant Examiner—Kee M. Tung
Attorney, Agent, or Firm—Foley & Lardner

[57] ABSTRACT

Digital samples of an underlying analog audio-frequency signal are converted to transform coefficients and a first bit assignment value indicating the number of quantization levels or bits is adaptively assigned to each coefficient according to the power distribution of the transform coefficients. The transform coefficients are weighted according to a prescribed pattern such as human's auditory sensitivity, and a second bit assignment value is further adaptively assigned to each transform coefficient according to the power distribution of the weighted transform coefficients. One of the first and second bit assignment values is selected according to the power distribution of the transform coefficients and used to quantize the transform coefficients. The quantized transform coefficients are multiplexed with supplemental information derived from the transform coefficients for transmission to a receiving site. A process inverse to that at the transmitting site is performed on the multiplexed signal to recover the original digital samples.

10 Claims, 2 Drawing Sheets

ADAPTIVE BIT ASSIGNMENT TRANSFORM CODING ACCORDING TO POWER DISTRIBUTION OF TRANSFORM COEFFICIENTS

RELATED APPLICATIONS

The present invention is related to Co-pending U.S. patent application Ser. No. 07/546,234, filed Jun. 29, 1990 and Co-pending U.S. patent application Ser. No. 07/613,122, filed Nov. 14, 1990, both being assigned to the same assignee as this application.

BACKGROUND OF THE INVENTION

The present invention relates to a bandwidth compression techniques for digital audio signals using an adaptive transform coding and decoding method.

Adaptive differential pulse-code modulation (ADPCM) technique is known as a practical way of bandwidth compression and has been extensively used in digital communications. Another bandwidth compression technique that is attractive for audio frequency signals is the adaptive transform coding scheme (ATC). As described in "Adaptive Transform coding of Speech Signals", IEEE Transactions on ASSP, Vol. 25, No. 4, 1977, pages 299-309, and "Approaches to Adaptive Transform Speech Coding at Low Bit Rates", IEEE Transactions on ASSP, Vol. 27, No. 1, 1979, pages 89-95, input discrete speech samples are buffered to form a block of N speech samples each. All samples of each block are linearly transformed into a group of transform coefficients based on a linear transform. These transform coefficients are then adaptively quantized independently and transmitted. The adaptation is controlled by a short-term basis spectrum that is derived from the transform coefficients prior to quantization and transmitted as a supplementary signal to the receiver. Specifically, the short-term basis spectrum is obtained by a bit assignment process in which quantization bits are assigned corresponding to the power of the transform coefficients. At the receiver, the quantized signals are adaptively dequantized according to a supplementary signal that is derived in a manner inverse to that of the transmitter, and an inverse transform is taken to obtain the corresponding block of reconstructed speech samples.

However, in some cases where the transform coefficients exhibit a uniform distribution of power, the number of quantization levels to be assigned to each transform coefficient is smaller than is necessary to ensure a satisfactory level of signal transmission quality.

SUMMARY OF THE INVENTION

It is therefore an object of the present invention to provide adaptive transform coding of digital samples representing an underlying audiofrequency analog waveform by assigning a varying number of quantization levels to transform coefficients according to the level of significance attached to transmitted information.

According to the present invention, digital samples of an underlying analog audio-frequency signal are translated into corresponding transform coefficients. A first bit assignment value indicating the number of bits to be used for quantization is adaptively assigned to each of the transform coefficients according to power distribution of the transform coefficients. The transform coefficients are weighted according to a prescribed pattern such as human's auditory sensitivity. A second assignment value is further adaptively assigned to each of the transform coefficients according to the power distribution of the weighted transform coefficients. One of the first and second bit assignment values is selected according to the power distribution of the transform coefficients and used to quantize the transform coefficients. The quantized transform coefficients are multiplexed with supplemental information which is derived from the transform coefficients.

The original digital samples are recovered by demultiplexing the multiplexed supplemental information and the quantized transform coefficients. A third bit assignment value indicating the number of bits for dequantization is adaptively assigned to each of the demultiplexed quantized transform coefficients according to the power distribution of the demultiplexed supplemental information. The demultiplexed supplemental information is weighted, and a fourth bit assignment value is further adaptively assigned to the demultiplexed quantized transform coefficients according to the power distribution of the weighted supplemental information. One of the third and fourth bit assignment values is selected according to the power distribution of the demultiplexed supplemental information, and the demultiplexed transform coefficients are dequantized according to the selected bit assignment value. The dequantized transform coefficients are then inversely linearly transformed into digital samples.

BRIEF DESCRIPTION OF THE DRAWINGS

The present invention will be described in further detail with reference to the accompanying drawings, in which.

DETAILED DESCRIPTION

Figure 1:
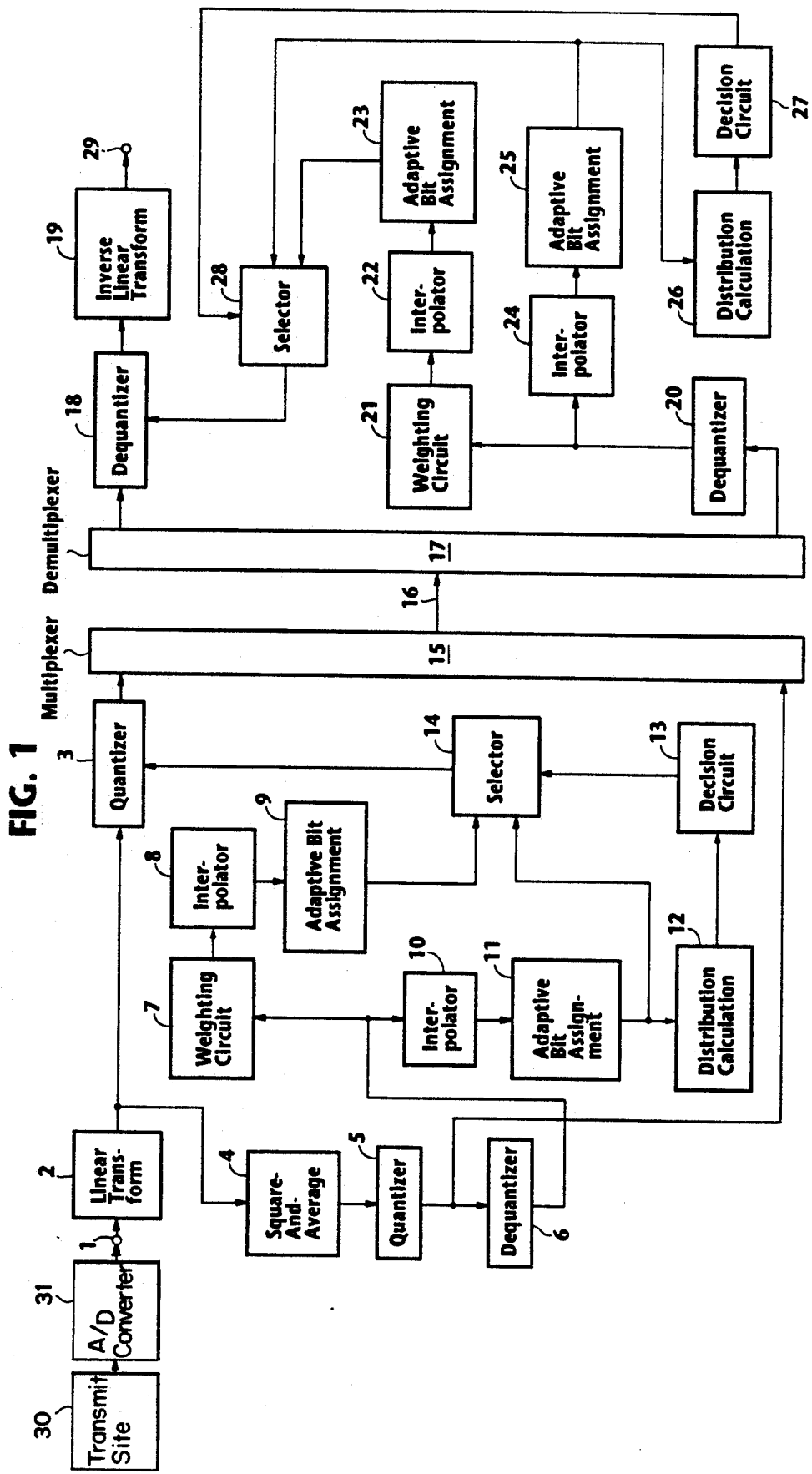
FIG. 1 shows in block form a digital communications system incorporating an adaptive linear transform coding/decoding scheme according to an embodiment of the present invention.

Referring now to FIG. 1, there is shown a data communications system employing an adaptive linear transform coding and decoding method according to a first embodiment of the present invention. At the transmit site 30, an analog audio-frequency signal, either speech or music, is first converted by A/D converter 31 to digital samples and a block of N digital samples are applied through an input terminal 1 to a known linear transform coder 2 so that each N-sample block is converted to N transform coefficients. The Walsh-Hadamard transform, the discrete Fourier transform, the discrete cosine transform and the Karhunen-Loéve transform are suitable linear transform coding for this purpose. Linear transform coder 2 is connected to an adaptive quantizer 3 having quantizer elements for quantizing a successive transform coefficient according to a bit assignment signal indicating the number of quantization levels into which that transform coefficient is to be quantized. A selector 14 supplies this bit assignment signal to quantizer 3.

For generating the bit assignment signal, a square-and-average circuit 4 is connected to the output of linear transform coder 2. In square-and-average circuit 4 the N transform coefficients of each block are squared and an average value of neighboring M squared values (where M is a divisor of N) is taken as a representative value. Therefore, L (=N/M) coefficients are taken from every N squared coefficients and quantized by a quantizer 5 and fed to a multiplexer 15 to be transmitted as supplemental information.

On the other hand, the output of quantizer 5 is dequantized by a dequantizer 6 and fed to a weighing circuit 7 in which it is weighted according to humans' auditory sensitivity, for example. The weighted transform coefficient is applied to an interpolator 8 in which the logarithm to the base 2 is taken and M−1 interpolations are provided between successive coefficients of weighted values. The output of interpolator 8 is fed to an adaptive bit assignment circuit 9 in which the following Equation is calculated:

$$\bar{R}_i = R + 0.5 \log_2 \sigma_i^2 - 0.5 N \sum_{n=1}^{N} \log_2 \sigma_n^2 \qquad (1)$$

where, $R_i$ is the number of bits assigned to an i-th transform coefficient, $\bar{R}$ is the average number of bits assigned to each transform coefficient, and $\sigma_i^2$ is a squared value of the i-th interpolated transform coefficient. The output of bit assignment circuit 9 is applied to one input of the selector 14 as a first bit assignment value indicating the number of bits as optimum quantization levels for that particular transform coefficient.

The output of dequantizer 6 is further applied to an interpolator 10 in which it is processed in a manner identical to that of interpolator 8, so that M−1 interpolations are provided between successive coefficients of non-weighted values. The output of interpolator 10 is applied to an adaptive bit assignment circuit 11 of identical construction to bit assignment circuit 9 to perform the calculation of Equation (1). The output of bit assignment circuit 11 is fed to the other input of selector 14 as a second bit assignment value indicating the number of bits with which the transform coefficient is to be quantized.

To the output of adaptive bit assignment circuit 11 is connected a distribution calculation circuit 12 in which the distribution of the bit assignment values is determined as follows:

$$\delta = \sum_{i=1}^{N} (X_i - \bar{X})^2 \qquad (2)$$

where, $\delta$ represents the variance of bit assignment values, $X_i$ represents the i-th input signal and $\bar{X}$ represents an average value of N input signals. Variance $\delta$ becomes smaller as input signals have a consistent value. The output of distribution calculation circuit 12 is compared by a decision circuit 13 with a prescribed threshold that indicates uniform distribution in which bit assignment can be uniformly applied to all transform coefficients. If the variance is higher than the threshold, the decision circuit 13 supplies a logic-0 output to selector 14 to couple the output of the bit assignment circuit 11 to quantizer 3. If the variance becomes smaller than the threshold, it supplies a logical-1 output to selector 14 to couple the output of assignment circuit 9 to quantizer 3. In this way, when the power distribution is not uniform, the transform coefficients are quantized with the non-weighted bit assignment value, and when the power distribution of transform coefficients becomes uniform, the transform coefficients are quantized with weighted bit assignment value. In this way, transform coefficients having greater significance in the sense of auditory perception are quantized with a greater number of quantization levels.

Alternatively, the distribution of signals can be represented by the following Equation:

$$\alpha = \log_2 \left( \frac{X_1}{\bar{X}} \cdot \frac{X_2}{\bar{X}} \cdots \frac{X_n}{\bar{X}} \right) \qquad (3)$$

where, $$\frac{X_i}{\bar{X}}$$

represents the normalized value of each input signal. Equation (3) reaches a near-zero value as the signals have a uniform distribution. Otherwise, it reaches minus infinity. The distribution can be further given by a difference $\Delta$ as follows:

$$\Delta = \max \{X\} - \min \{X\} \qquad (4)$$

where max $\{X\}$ and min $\{X\}$ indicate respectively a maximum value of N input signals and a minimum value of N input signals.

The quantized transform coefficients are multiplexed with the supplemental signal from quantizer 5 by multiplexer 15 and transmitted over a transmission channel 16 to a receiving site in which it demultiplexes the transmitted signal by a demultiplexer 17 at the receiving site into signals which are coupled to dequantizers 18 and 20, respectively.

The demultiplexed signals are processed in a manner inverse to that at the transmitting site. Specifically, the signal fed into dequantizer 18 corresponds to the output signal of the transmitter's quantizer 3, and is dequantized in response to a bit assignment signal from a selector 28 and converted to a signal which is a replica of the signal at the output of transmitter's linear transform coder 2. An inverse linear transform coder 19 is coupled to the output of dequantizer 18 to recover the original digital signal at an output terminal 29. On the other hand, the signal fed into dequantizer 20 is the supplemental information corresponding to the signal at the output of transmitter's quantizer 5. The output of dequantizer 20 is applied to a weighting circuit 21 in which it is weighted in a manner identical to the transmitter's weighting circuit 7. The weighted signal is applied to an interpolator 22 in which interpolations are provided between successive input signals. An adaptive bit assignment circuit 23 identical to the transmitter's adaptive bit assignment circuit 9 is coupled to interpolator 22 to generate a weighted bit assignment signal for coupling to one input off selector 28. An interpolator 24 and an adaptive bit assignment circuit 23 are connected in series to the output of dequantizer 20 to generate a non-weighted bit assignment signal for coupling to the other input of selector 28. A distribution calculator 26 and a decision circuit 27 are connected to the output of bit assignment circuit 25, corresponding to the transmitter's distribution calculator 12 and decision circuit 13, respectively. When the signal distribution is uniform, the weighted signal from bit assignment circuit 23 is coupled by selector 28 to dequantizer 18. Otherwise, the non-weighted signal from bit assignment circuit 25 is applied to dequantizer 18.

Figure 2:
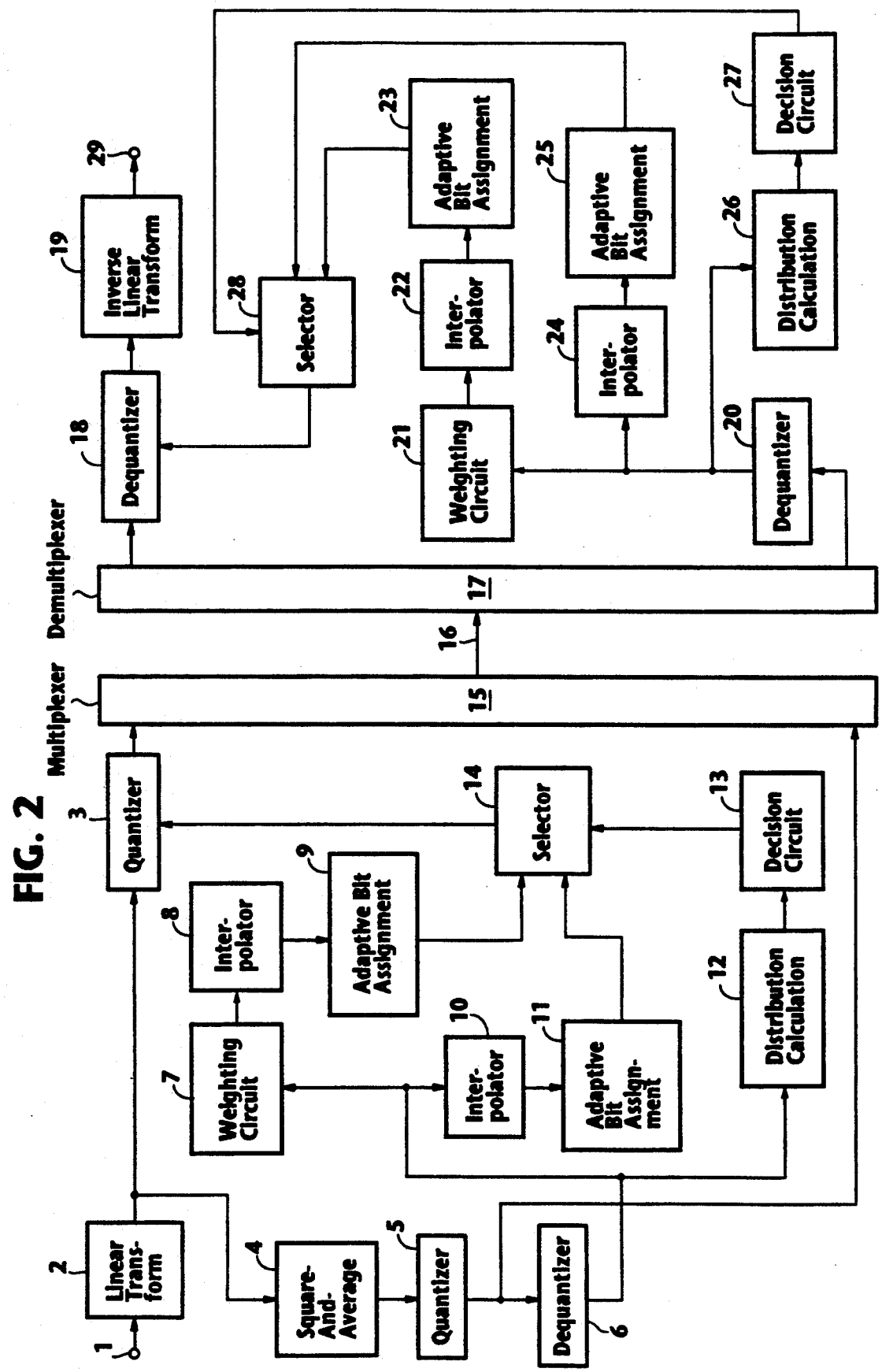
FIG. 2 shows in block form an alternative form of the digital communications system of the present invention.

Since the power distribution of signals at the output of quantizer 5 approximates the power distribution of signals at the output of adaptive bit assignment circuit 11, the present invention can be modified as shown in FIG. 2. In this modification, the transmitter's distribution calculator 12 takes its input from the output of dequantizer 6, rather than from the output of bit assignment circuit 11. Likewise, at the receiving site distribution calculator 26 takes its input from the output of dequantizer 20, rather than from the output of bit assignment circuit 25. This modification is advantageous for simplifying the distribution calculators since the amounts of information supplied to the calculators are smaller than those of the previous embodiment and hence the amounts of calculations involved can be reduced.

The foregoing description shows only preferred embodiments of the present invention. Various modifications are apparent to those skilled in the art without departing from the scope of the present invention which is only limited by the appended claims. For certain applications, the square-and-average circuit 4, quantizer 5, dequantizer 6 and interpolators 8 and 10 may be dispensed with at the transmitting site, and at the receiving site the use of dequantizer 20 and interpolators 22 and 24 can also be omitted. Therefore, the embodiments shown and described are only illustrative, not restrictive.

What is claimed is:

1. A method of adaptive transform coding an analog audio-frequency signal for transmitting signals from a transmitter to a receiver comprising the steps of:
   a) generating said analog audio frequency signal;
   b) converting said analog audio-frequency signal to digital signals;
   c) linearly transforming said digital signals to corresponding transform signals, defined as transform coefficients;
   d) adaptively assigning a first bit assignment value to each of the transform coefficients according to power distribution of the transform coefficients, said first bit assignment value indicating a number of bits with which the transform coefficient is to be quantized;
   e) squaring N transform coefficients of the step (c) and averaging neighboring M squared transform coefficients to produce N/M average coefficients;
   f) weighting the average coefficients according to human auditory sensitivity as a function of audio frequency;
   g) adaptively assigning a second bit assignment value to each of the transform coefficients of the step (c) according to power distribution of the average coefficients weighted by the step (f), said second bit assignment value indicating a number of bits with which the transform coefficient is to be quantized;
   h) selecting one of the first and second bit assignment values according to power distribution of the transform coefficients of the step (c);
   i) quantizing the transform coefficients of the step (c) according to the bit assignment value selected by the step (h);
   j) multiplexing the average coefficients with the transform coefficients quantized by the step (i), resulting in a multiplexed signal; and
   k) transmitting said multiplexed signal to said receiver.

2. A method of adaptive transform coding an analog audio-frequency signal for transmitting signals from a transmitter to a receiver as claimed in claim 1, further comprising, in said receiver, the steps of:
   A) demultiplexing the multiplexed signal into demultiplexed average coefficients and quantized demultiplexed transform coefficients;
   B) adaptively assigning a third bit assignment value to each of the demultiplexed quantized transform coefficients according to power distribution of the demultiplexed average coefficients, said third bit assignment value indicating a number of bits with which the demultiplexed quantized transform coefficient is to be dequantized;
   C) weighting the demultiplexed average coefficients of the step (A) according to the human auditory sensitivity as a function of audio frequency;
   D) adaptively assigning a fourth bit assignment value to each of the demultiplexed quantized transform coefficients according to power distribution of the demultiplexed average coefficients weighted by the step (C) said fourth bit assignment value indicating a number of bits with which the demultiplexed quantized transform coefficient is to be dequantized;
   E) selecting one of the third and fourth bit assignment values according to distribution of the demultiplexed average coefficients;
   F) dequantizing the demultiplexed quantized transform coefficients according to the bit assignment value selected by the step (E); and
   G) inversely linearly transforming the coefficients dequantized by the step (F) to digital signals.

3. A method of adaptive transform coding an analog audio-frequency signal for transmitting signals from a transmitter to a receiver comprising the steps of:
   a) generating said analog audio frequency signal;
   b) converting said analog audio-frequency signal to digital signals;
   c) linearly transforming said digital signals to corresponding transform signals, defined as transform coefficients;
   d) adaptively assigning a first bit assignment value to each of the transform coefficients according to power distribution of the transform coefficients, said first bit assignment value indicating a number of bits with which the transform coefficient is to be quantized;
   e) squaring N transform coefficients of the step (c) and averaging neighboring M squared transform coefficients to produce N/M average coefficients;
   f) weighting the average coefficients according to human auditory sensitivity as a function of audio frequency;
   g) adaptively assigning a second bit assignment value to each of the transform coefficients of the step (c) according to power distribution of the average coefficients weighted by the step (f), said second bit assignment value indicating a number of bits with which the transform coefficient is to be quantized;
   h) determining if the average coefficients have a non-uniform power distribution or a uniform power distribution;
   i) selecting the first bit assignment value if the average coefficients are determined by the step (h) as having a non-uniform distribution and selecting the second bit assignment value if the average coefficients are determined by the step (h) as having a uniform distribution;

i) quantizing the transform coefficients of the step (c) according to the bit assignment value selected by the step (i);

k) multiplexing the average coefficients produced by the step (c) with the transform coefficients quantized by the step (j), resulting in a multiplexed signal; and l) transmitting said multiplexed signal to said receiver.

4. A method of adaptive transform coding an analog audio-frequency signal for transmitting signals from a transmitter to a receiver as claimed in claim 3, further comprising, in said receiver, the steps of:

A) demultiplexing the multiplexed signal into demultiplexed average coefficients and demultiplexed quantized transform coefficients;

B) adaptively assigning a third bit assignment value to each of the demultiplexed quantized transform coefficients according to power distribution of the demultiplexed average coefficients, said third bit assignment value indicating a number of bits with which the demultiplexed quantized transform coefficients are to be dequantized;

C) weighting the demultiplexed average coefficients according to human auditory sensitivity as a function of audio frequency;

D) adaptively assigning a fourth bit assignment value to each of the demultiplexed quantized transform coefficients according to power distribution of the weighted demultiplexed average coefficients, said fourth bit assignment value indicating a number of bits with which the demultiplexed quantized transform coefficients are to be dequantized;

E) determining if the demultiplexed average coefficients has a non-uniform power distribution or a uniform power distribution;

F) selecting the third bit assignment value if said demultiplexed average coefficients a r e determined by the step (E) as having a non-uniform power distribution and selecting the fourth bit assignment value if said demultiplexed average coefficients are determined by the step (E) as having a uniform power distribution;

G) dequantizing the demultiplexed quantized transform coefficients according to the bit assignment value selected by the step (F); and H) inversely linearly transforming the transform coefficients dequantized by the step (G) to digital signals.

5. An apparatus for adaptive transform coding an audio-frequency signal for transmitting signals from a transmitter to a receiver comprising:

means for generating said analog audio-frequency signal;

a converter for converting said analog audio-frequency signal to digital signals;

a linear transform coder for linearly transforming said digital signals to corresponding transform signals, defined as transform coefficients;

first adaptive bit assignment means for assigning a first bit assignment value to each of the transform coefficients according to power distribution of the transform coefficients, said first bit assignment value indicating a number of bits with which the transform coefficient is to be quantized;

a square and average circuit for squaring N transform coefficients from said linear transform coder and averaging neighboring M squared transform coefficient to produce L average coefficients, where $L=N/M$;

weighting means for weighting said average coefficients according to human auditory sensitivity as a function of audio frequency;

second adaptive bit assignment means for assigning a second bit assignment value to each of the transform coefficients from said coder according to power distribution of weighted average coefficients, said second bit assignment value indicating a number of bits with which the transform coefficient is to be quantized;

distribution calculation means for detecting power distribution of the average coefficients;

decision means for comparing the detected power distribution of the average coefficients with a prescribed threshold;

selector means for selecting the first bit assignment value if the decision means determines that the power distribution is higher than the threshold and selecting the second bit assignment value if the decision means determines that the power distribution is lower than the threshold;

an adaptive quantizer for quantizing the transform coefficients from said coder according to the bit assignment value selected by the selector means;

multiplexer means for multiplexing the quantized transform coefficients with said average coefficients and outputting a multiplexed signal; and a transmission channel for transmitting said multiplexed signal to said receiver.

6. An apparatus for adaptive transform coding an audio-frequency signal for transmitting signals from a transmitter to a receiver as claimed in claim 5, wherein said receiver further comprises:

demultiplexer means for demultiplexing the multiplexed signal into the demultiplexed quantized transform coefficients and the demultiplexed average coefficients;

third bit assignment means for adaptively assigning a third bit assignment value to each of the demultiplexed quantized transform coefficients according to power distribution of the demultiplexed average coefficients, said third bit assignment value indicating a number of bits with which the demultiplexed quantized transform coefficient is to be dequantized;

second weighting means for weighting the demultiplexed average coefficients according to human auditory sensitivity as a function of audio frequency;

fourth bit assignment means for adaptively assigning a fourth bit assignment value to each of the demultiplexed quantized transform coefficients according to power distribution of the weighted demultiplexed average coefficients, said fourth bit assignment value indicating a number of bits with which the demultiplexed quantized transform coefficient is to be dequantized;

second selector means for selecting one of the third and fourth bit assignment values according to power distribution of the demultiplexed average coefficients;

dequantizer means for dequantizing the demultiplexed quantized transform coefficients according to the bit assignment value selected by the second selector means; and an inverse linear transform coder for inversely linearly transforming the transform coefficients dequantized by the dequantizer means into digital signals.

7. An apparatus for adaptive transform coding an audio-frequency signal for transmitting signals from a transmitter to a receiver comprising:

means for generating said analog audio-frequency signal;

a converter for converting said analog audio-frequency signal to N digital signals;

a linear transform coder for linearly transforming N digital audio-frequency samples to N corresponding transform signals, defined as transform coefficients;

averaging means for detecting an average value of M transform coefficients to produce N/M average transform coefficients for every N transform coefficients;

first adaptive bit assignment means for assigning a first bit assignment value to each of the transform coefficients according to power distribution of the transform coefficients, said first bit assignment value indicating a number of bits with which the transform coefficient is to be quantized;

weighting means for weighting said average transform coefficients according to human auditory sensitivity as a function of audio frequency;

second adaptive bit assignment means for assigning a second bit assignment value to each of the transform coefficients from said coder according to power distribution of the average transform coefficients weighted by the weighting means, said second bit assignment value indicating a number of bits with which the transform coefficient is to be quantized;

distribution calculation means for detecting power distribution of the transform coefficients from output signals from one of said averaging means and said first adaptive bit assignment means;

decision means for comparing the detected power distribution with a prescribed threshold;

selector means for selecting the first bit assignment value if the decision means determines that the power distribution is higher than the threshold and selecting the second bit assignment value if the decision means determines that the power distribution is lower than the threshold;

an adaptive quantizer for quantizing the transform coefficients from said coder according to the bit assignment value selected by the selector means;

multiplexer means for multiplexing the transform coefficients quantized by the adaptive quantizer with the average transform coefficients and outputting a multiplexed signal; and a transmission channel for transmitting said multiplexed signal to said receiver.

8. An apparatus for adaptive transform coding an audio-frequency signal for transmitting signals from a transmitter to a receiver comprising:

means for generating said analog audio-frequency signal;

a converter for converting said analog audio-frequency signal to N digital signals;

a linear transform coder for linearly transforming N digital audio-frequency samples to N corresponding transform signals, defined as transform coefficients;

averaging means for detecting an average value of M transform coefficients to produce N/M average transform coefficients for every N transform coefficients;

first quantizer means for quantizing the average transform coefficients;

dequantizer means for dequantizing the average transform coefficients quantized by the first quantizer means;

first interpolator means for providing interpolations between successive dequantized average transform coefficients;

first adaptive bit assignment means for assigning a first bit assignment value to each of the transform coefficients from said coder according to power distribution of output signals from the first interpolator means, said first bit assignment value indicating a number of bits with which the transform coefficient is to be quantized;

weighting means for weighting the dequantized average transform coefficients according to human auditory sensitivity as a function of audio frequency;

second interpolator means for providing interpolations between successive output signals from the weighting means;

second adaptive bit assignment means for assigning a second bit assignment value to each of the transform coefficients from said coder according to power distribution of output signals from the second interpolator means, said second bit assignment value indicating a number of bits with which the transform coefficient is to be quantized;

distribution calculation means for detecting power distribution of the average transform coefficients;

decision means for comparing the detected power distribution with a prescribed threshold;

selector means for selecting the first bit assignment value if the decision means determines that said power distribution is higher than the threshold and selecting the second bit assignment value if the decision means determines that said power distribution is lower than the threshold;

second adaptive quantizer means for quantizing the transform coefficients from said coder according to the bit assignment value selected by the selector means;

multiplexer means for multiplexing an output signal from the first quantizer means with an output signal from the second quantizer means and outputting a multiplexed signal; and a transmission channel for transmitting said multiplexed signal to said receiver.

9. An adaptive transform coding apparatus as claimed in claim 8, wherein the distribution calculation means detects said power distribution from the output of said dequantizer means.

10. An adaptive transform coding apparatus as claimed in claim 8, wherein the distribution calculation means detects said power distribution from the output of said first adaptive bit assignment means.

* * * * *